United States Patent
Turull et al.

(10) Patent No.: US 10,725,823 B2
(45) Date of Patent: Jul. 28, 2020

(54) COORDINATED SCHEDULING BETWEEN REAL-TIME PROCESSES

(71) Applicant: Telefonaktiebolaget LM Ericsson (publ), Stockholm (SE)

(72) Inventors: Daniel Turull, Sundbyberg (SE); Lars Westberg, Enköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 115 days.

(21) Appl. No.: 15/520,532

(22) PCT Filed: Oct. 22, 2014

(86) PCT No.: PCT/SE2014/051247
§ 371 (c)(1),
(2) Date: Apr. 20, 2017

(87) PCT Pub. No.: WO2016/064312
PCT Pub. Date: Apr. 28, 2016

(65) Prior Publication Data
US 2017/0308403 A1    Oct. 26, 2017

(51) Int. Cl.
*G06F 9/48*    (2006.01)
*G06F 9/455*    (2018.01)

(52) U.S. Cl.
CPC .......... *G06F 9/4887* (2013.01); *G06F 9/4555* (2013.01); *G06F 9/45554* (2013.01)

(58) Field of Classification Search
None
See application file for complete search history.

(56) References Cited

U.S. PATENT DOCUMENTS

| 8,719,823 B2 | 5/2014 | Subrahmanyam et al. |
| 2004/0210904 A1 * | 10/2004 | Jones .................... G06F 9/4887 718/107 |

(Continued)

FOREIGN PATENT DOCUMENTS

| EP | 1185930 A2 | 3/2002 |
| FR | 2997773 A1 | 5/2014 |
| WO | 2006068943 A2 | 6/2006 |

OTHER PUBLICATIONS

Kiszka, Jan, "Towards Linux as a Real-Time Hypervisor", Siemens AG, Jan. 2009, 1-10.

(Continued)

*Primary Examiner* — Duy Khuong T Nguyen
*Assistant Examiner* — Melissa A Headly
(74) *Attorney, Agent, or Firm* — Sage Patent Group

(57) ABSTRACT

There is provided a method for coordinated scheduling between real-time processes. The method is performed by a central scheduler. The method comprises acquiring information on runtimes and deadlines for real-time processes of tasks for local schedulers to be executed on shared computing resources. The method comprises scheduling the real-time processes based on the runtimes and deadlines so as to keep the deadlines during execution of the real-time processes. There is also provided a central scheduler configured to perform such a method. There is also provided a computer program comprising computer program code which, when run on a processing unit of a central scheduler causes the processing unit to execute such a method.

8 Claims, 12 Drawing Sheets

(56) References Cited

U.S. PATENT DOCUMENTS

| | | | |
|---|---|---|---|
| 2010/0242045 A1* | 9/2010 | Swamy | G06F 9/455 718/104 |
| 2012/0079486 A1 | 3/2012 | Brandt et al. | |
| 2012/0147840 A1* | 6/2012 | Chen | H04L 1/188 370/329 |

OTHER PUBLICATIONS

Xi, Sisu et al., "Real-Time Multi-Core Virtual Machine Scheduling in Xen", Proceedings of the 14th International Conference on Embedded Software EMSOFT '14, Oct. 12-17, 2014, 1-10.

Lin, Tsung-Han et al., "Improving GPOS Real-time Responsiveness Using vCPU Migration in an Embedded Multicore Virtualization Platform", 2013 IEEE 16th International Conference on Computational Science and Engineering, pp. 1-8.

Zuo, Baojing et al., "Performance Tuning Towards a KVM-based Low Latency Virtualization System", School of Software; School of Information Security Engineering; Department of Computer Science and Engineering, Shanghai Key Laboratory of Scalable Computing and Systems, Shanghai Jiao Tong University, Shanghai, China, pp. 1-4.

* cited by examiner

COORDINATED SCHEDULING BETWEEN REAL-TIME PROCESSES

TECHNICAL FIELD

Embodiments presented herein relate to coordinated scheduling between real-time processes, and particularly to a method, a central scheduler, a computer program, and a computer program product for coordinated scheduling between real-time processes.

BACKGROUND

Computer virtualization is a mechanism that permits to abstract different hardware parts of a computer platform and to execute different operating systems using the computer platform. In general terms, there may be several ways of virtualizing a computer platform. One commonly used way is based on a Virtual Machine Monitor (VMM), also referred to as a hypervisor. The hypervisor may be defined as a layer of software that provides to the virtual machine (VM) the illusion that it is running its own physical resources.

In general terms, Real Time Operating Systems (RTOS) provide a common ground to execute tasks or processes that has deadlines for when they need to be executed. Some example of such of tasks may include, but not limited to, control systems in industrial applications, multimedia applications, car control systems, and telecommunications control systems. In general terms, General-purpose Operating Systems (GTOS) may be used for generic purposes and may be generic to accommodate a variety of tasks.

Computer virtualization permits to run unmodified Operating Systems (OS) inside the host OS. This may generate some signalling and/or computational overhead since some devices of the computer platform need to be emulated. The guest OS, i.e., the operating system that runs on the virtualization environments, may use physical device drivers to interact with the emulated hardware provided by the VMM. The physical device drivers handle operations needed by the hardware, which might be complex operations. The device emulation may be required to provide the same interfaces and functionality as the real hardware. This may not be optimal because the physical device driver(s) and the emulated device(s) may need to perform operations that are not necessary if only performed in software. However, this procedure can be simplified or changed, since the underlying platform is emulated. The use of paravirtualization, where the device drivers are modified and where functions provided by the VMM or hypervisor are directly called (by using hypercalls) may overcome such issues. This may effectively reduce the overhead and may increase performance.

Containers define another technology that permits to isolate different tasks. Containers provide lightweight virtualization; the isolation is directly provided by the operating system, which isolates the tasks that belong to different containers.

Consider now a real-time networking architecture. In such real-time networking architectures there may be queuing schedulers that, for example, provide Quality of Service (QoS) differentiation. The so-called Differentiated-Services (DiffServ.) defined by IETF provides a marking scheme for delay differentiation (Class-of-Service) in routers. The most time-critical class Expedited Forwarding (EF) requires limited delays and is used to time-sensitive applications. Simple strict-priority schedulers can be used, but more advanced queuing schemes, such as deadline schedulers, have been suggested. However, the assignments of deadlines to packets of these time-sensitive applications are made internally within the router.

Certain radio access network (RAN) nodes, such as the enodeB in the Long Term Evolutional (LTE) telecommunications system may handle deadline scheduling. This is however mainly used for implementation of layer one ($L_1$) and layer two ($L_2$) signalling.

In "Towards Linux as a real-time hypervisor" by J. Kiszka in 11th Real Time Linux Workshop RTLWS11, 2009, Dresden, Germany, it is proposed to make KVMs (Kernel-based Virtual Machines) able to virtualize a Real Time system using the real time Linux kernel. KVM VMs use QEMU (Quick EMUlator) as emulator. Changing the priorities to RT can increase responsiveness. Also the kernel for the host is changed to be RT. Scheduler paravirtualization, which notifies the host when a VM needs to execute a RT process in order to boost its priority, is introduced. Kernel parameters are modified to obtain sub-millisecond latencies.

An architecture for executing RT tasks within VMs is presented in "Real-Time Multi-Core Virtual Machine Scheduling in Xen" by S. Xi, M. Xu, C. Lu, L. T. X. Phan, C. Gill, O. Sokolsky and I. Lee, Washington University Technical Report, WUCSE-2013-109, October 2013. A scheduler that permits to guarantee a certain amount of execution time for each VM is provided. The system administrator needs to specify the needs of the VMs. Inside the VM another scheduler is in charge of scheduling the different tasks.

Current approaches for handling different tasks in VMs are based on priorities, giving a boost to a specific VM when it requires finishing a task as soon as possible. This might help when running different workloads at the same time but it does not work well when all the VMs need to be prioritized at the same time. RT Xen is an open-source virtualization platform for systems integration and cloud computing with real-time performance guarantees. It provides soft guaranties for scheduling the VMs, but the system administrator needs to specify the characteristics of the workload.

Current scheduler mechanisms that use internal information from inside the VM do only provide hints that they need a higher priority but not the duration of such priority.

Further, networking packet queues are independent of the execution scheduling and thus the priority for such packets may not be settled yet.

Hence, there is still a need for an improved handling of tasks, such as real-time processes, to be executed on shared computing resources.

SUMMARY

An object of embodiments herein is to provide efficient handling of tasks, such as real-time processes, to be executed on shared computing resources.

The inventors of the enclosed embodiments have through realized that running complete operating systems as virtual machines as black boxes does not provide any information to the scheduler in the virtual machine regarding assigning the proper resources to keep all the task deadlines that run inside the virtual machine.

A particular object is therefore to provide efficient handling of tasks, such as real-time processes, for local schedulers to be executed on shared computing resources.

According to a first aspect there is presented a method for coordinated scheduling between real-time processes. The method is performed by a central scheduler. The method comprises acquiring information on runtimes and deadlines for real-time processes of tasks for local schedulers to be executed on shared computing resources. The method comprises scheduling the real-time processes based on the runtimes and deadlines so as to keep the deadlines during execution of the real-time processes.

Advantageously this provides efficient handling of tasks, such as real-time processes, to be executed on shared computing resources.

Advantageously this provides efficient handling of tasks, such as real-time processes, for local schedulers to be executed on shared computing resources.

Advantageously, this enables multiple RT VMs to be consolidated in a single host. Current approaches suggest having a limited number of RT VM in each central processing unit (CPU) core. Advantageously, the herein disclosed method permits to increase the utilization of each CPU core with more RT VMs, which may reduce cost and energy consumption.

Advantageously, this enables multiple RT VMs with different deadlines to be run within the same CPU core, thereby increasing the utilization of available computational resources, and thus allowing more VMs than for current approaches to be running at the same hosts. This may reduce the operational costs.

Advantageously, this enables different RT tasks inside VMs to be scheduled as a function of deadlines of the RT tasks, instead of their priority. This may benefit cloud environments where multiple RT VM, such as, for Radio Control Traffic, can be collocated in the same physical machine and CPU core, keeping their deadlines.

Advantageously, combined with radio scheduling this enables resources to be optimized when radio functions are virtualized inside VMs.

According to a second aspect there is presented a central scheduler for coordinated scheduling between real-time processes. The central scheduler comprises a processing unit. The processing unit is configured to acquire information on runtimes and deadlines for real-time processes of tasks for local schedulers to be executed on shared computing resources. The processing unit is configured to schedule the real-time processes based on the runtimes and deadlines so as to keep the deadlines during execution of the real-time processes.

According to a third aspect there is presented a computer program for coordinated scheduling between real-time processes, the computer program comprising computer program code which, when run on a processing unit of a central scheduler, causes the processing unit to perform a method according to the first aspect.

According to a fourth aspect there is presented a computer program product comprising a computer program according to the third aspect and a computer readable means on which the computer program is stored.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

The embodiments disclosed herein relate to coordinated scheduling between real-time processes. In order to obtain such coordinated scheduling there is provided a central scheduler, a method performed by the central scheduler, a computer program comprising code, for example in the form of a computer program product, that when run on a processing unit of a central scheduler, causes the processing unit to perform the method.

Figure 1A:
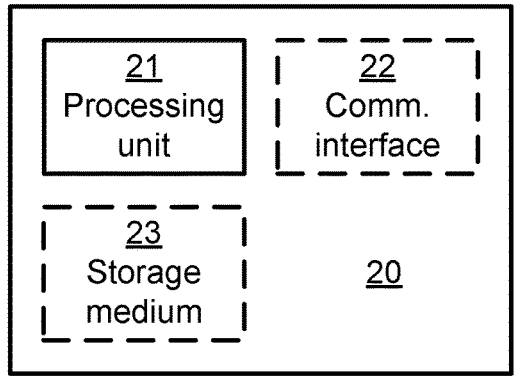
FIG. 1a is a schematic diagram showing functional units of a central scheduler according to an embodiment.

FIG. 1a schematically illustrates, in terms of a number of functional units, the components of a central scheduler 20 according to an embodiment. A processing unit 21 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 31 (as in FIG. 2), e.g. in the form of a storage medium 23. Thus the processing unit 21 is thereby arranged to execute methods as herein disclosed. The storage medium 23 may also comprise persistent storage, which, for example, can be any single one or combination of magnetic memory, optical memory, solid state memory or even remotely mounted memory. The central scheduler 20 may further comprise a communications interface 22 for communications with at least one local scheduler 205 and/or at least one remote scheduler 302. As such the communications interface 22 may comprise one or more transmitters and receivers. The processing unit 21 controls the general operation of the central scheduler 20 e.g. by sending data and control signals to the communications interface 22 and the storage medium 23, by receiving data and reports from the communications interface 22, and by retrieving data and instructions from the storage medium 23. Other components, as well as the related functionality, of the central scheduler 20 are omitted in order not to obscure the concepts presented herein. There may be different ways to provide the central scheduler. For example, the central scheduler may be provided in a core network node.

Figure 1B:
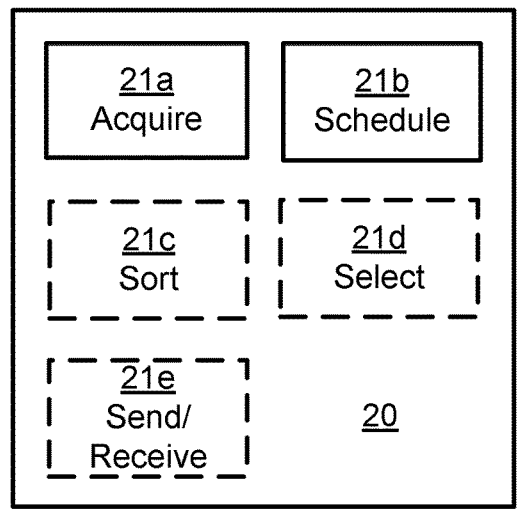
FIG. 1b is a schematic diagram showing functional modules of a central scheduler according to an embodiment.

FIG. 1b schematically illustrates, in terms of a number of functional modules, the components of a central scheduler 20 according to an embodiment. The central scheduler 20 of FIG. 1b comprises a number of functional modules; an acquire module 21a configured to perform below step S102, S104, S104a, and a schedule module 21b configured to perform below step S106. The central scheduler 20 of FIG. 1b may further comprises a number of optional functional modules, such as any of a sort module 21c configured to perform below step S106a, a select module 21d configured to perform below step S106b, and a send/receive module 21e configured to perform below step SS106c, S106d, S106e. The functionality of each functional module 21a-e will be further disclosed below in the context of which the functional modules 21a-e may be used. In general terms, each functional module 21a-e may be implemented in hardware or in software. Preferably, one or more or all functional modules 21a-e may be implemented by the processing unit 21, possibly in cooperation with functional units 22 and/or 23. The processing unit 21 may thus be arranged to from the storage medium 23 fetch instructions as provided by a functional module 21a-e and to execute these instructions, thereby performing any steps as will be disclosed hereinafter.

The central scheduler 20 may be provided as a standalone device or as a part of a further device. For example, the central scheduler 20 may be provided in an apparatus 100, 100' in the form of a general computing platform. The central scheduler 20 may be provided as an integral part of the apparatus 100, 100'. That is, the components of the central scheduler 20 may be integrated with other components of the apparatus 100; some components of the apparatus 100, 100' and the central scheduler 20 may be shared. For example, if the apparatus 100, 100' as such comprises a processing unit, this processing unit may be arranged to perform the actions of the processing unit 21 of with the central scheduler 20. Alternatively the central scheduler 20 may be provided as a separate unit in the apparatus 100, 100'.

Figure 2:
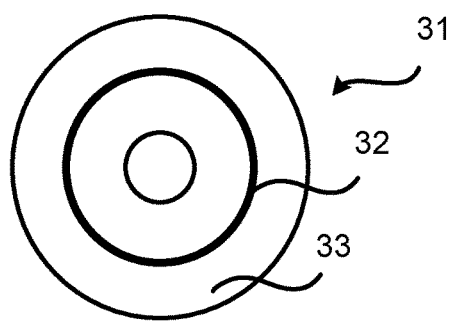
FIG. 2 shows one example of a computer program product comprising computer readable means according to an embodiment.

FIG. 2 shows one example of a computer program product 31 comprising computer readable means 33. On this computer readable means 33, a computer program 32 can be stored, which computer program 32 can cause the processing unit 21 and thereto operatively coupled entities and devices, such as the communications interface 22 and the storage medium 23, to execute methods according to embodiments described herein. The computer program 32 and/or computer program product 31 may thus provide means for performing any steps as herein disclosed.

In the example of FIG. 2, the computer program product 31 is illustrated as an optical disc, such as a CD (compact disc) or a DVD (digital versatile disc) or a Blu-Ray disc. The computer program product 31 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 32 is here schematically shown as a track on the depicted optical disk, the computer program 32 can be stored in any way which is suitable for the computer program product 31.

Figure 3:
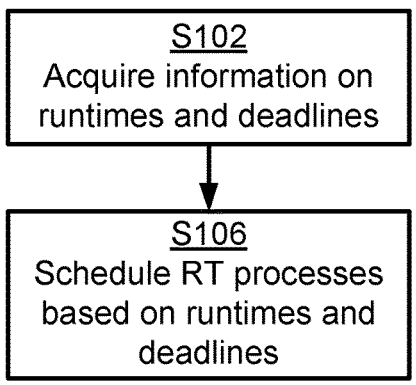
FIGS. 3, 4, 7, 10, 11, and 12 are flowcharts of methods according to embodiments.
Figure 4:
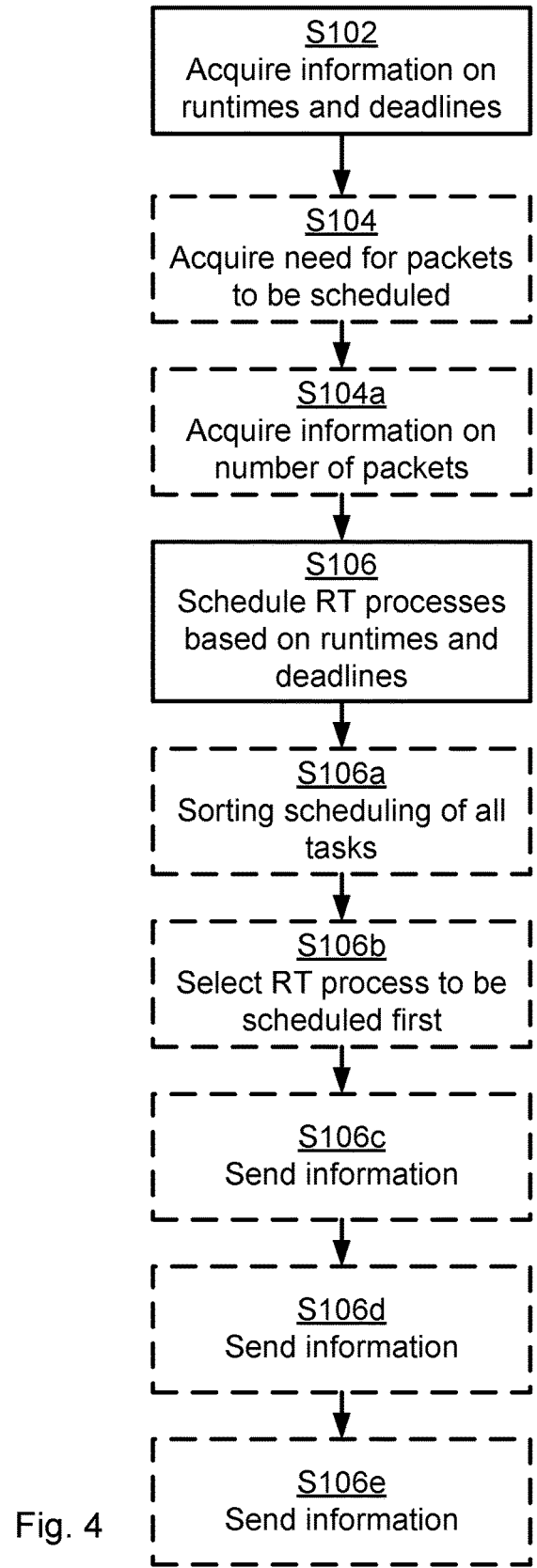

FIGS. 3 and 4 are flow chart illustrating embodiments of methods for coordinated scheduling between real-time processes. The methods are performed by the processing unit 21 of the central scheduler 20. The methods are advantageously provided as computer programs 32.

Reference is now made to FIG. 3 illustrating a method for coordinated scheduling between real-time processes as performed by a central scheduler 20 according to an embodiment.

The scheduler uses deadline information to schedule different tasks. Particularly, the processing unit of the central scheduler 20 is configured to perform step S102:

S102: Information on runtimes and deadlines for real-time processes of tasks for local schedulers 205, 223 to be executed on shared computing resources is acquired.

The scheduler schedules the different tasks in a way that all tasks are executed within their deadlines, which might be different for different tasks. Particularly, the processing unit of the central scheduler 20 is configured to perform step S106:

S106: The real-time processes are scheduled based on the runtimes and deadlines so as to keep the deadlines during execution of the real-time processes.

Embodiments relating to further details of coordinated scheduling between real-time processes will now be disclosed.

Reference is now made to FIG. 4 illustrating methods for coordinated scheduling between real-time processes as performed by a central scheduler 20 according to further embodiments.

There may be different ways to schedule the real-time processes. Different embodiments relating thereto will now be described in turn.

For example, the central scheduler 20 may sort (prioritize) between different tasks. Particularly, the processing unit of the central scheduler 20 may be configured to perform an optional step S106a:

S106a: The real-time processes are scheduled by sorting scheduling of all tasks according to their respective deadlines.

For example, one real-time (RT) process may be selected. Particularly, the processing unit of the central scheduler 20 may be configured to perform an optional step S106b:

S106b: The real-time processes are scheduled by selecting one of the real-time processes with earliest deadline to be executed first by the shared computing resources.

For example, the scheduling may take switching between different VMs into account. That is, scheduling the real-time processes may further be based on time for switching between different ones of the real-time processes being executed in the shared computing resources. Such information may be regarded as local information in the system. The information may be static with a configuration parameter or calculated from previous switching times.

There may be different scenarios for when the scheduling is needed. Different embodiments relating thereto will now be described in turn.

For example, the scheduling may relate to a need for packets 108 of a local scheduler 205 to be scheduled. Particularly, the processing unit of the central scheduler 20 may be configured to perform optional steps S104 and S106c:

S104: A need is acquired from a local scheduler 205 responsible for performing one of the tasks. This task requires packets 108 of a remote scheduler 302 to be scheduled.

S106c: Information relating to the deadlines is sent to the remote scheduler 302.

There may be different ways for the central scheduler 20 to determine scheduling of the packets 108 of the local scheduler 205. For example this scheduling may be based on information regarding the number of packets 108 and the estimated runtime. Particularly, the processing unit of the central scheduler 20 may be configured to perform an optional step S104a:

S104a: Information is acquired from one of the local schedulers 205, 223. The information is indicative of the number of packets 108 expected to be generated by the local schedulers 205, 223 when performing the task. The information is further indicative of the runtime for performing the task.

The scheduling may then involve sending information about the number of packets 108 to the remote scheduler 302. Particularly, the processing unit of the central scheduler 20 may be configured to perform an optional step S106d:

S106d: The real-time processes are scheduled by sending information regarding the number of packets 108 to be scheduled to the remote scheduler 302.

The scheduling may then additionally or alternatively involve sending deadline information to the remote scheduler 302. Particularly, the processing unit of the central scheduler 20 may be configured to perform an optional step S106e:

S106e: The real-time processes are scheduled by sending information regarding said deadlines to the remote scheduler 302.

The packet scheduling may then involve the remote scheduler 302 to send and/or receive packets 108 needed for the tasks to be completed by the local schedulers 205, 223.

There may be different examples of deadlines. Different embodiments relating thereto will now be described in turn. For example, one of the deadlines may relate to at least one of a compute deadline and a network deadline for its respective task. The network deadline may be a deadline for when the packets 108 needs to be sent to and/or received from a remote scheduler 302. The compute deadline may be a deadline assigned to the task to be complete by the local schedulers 205, 223. Further examples and considerations regarding deadlines will be provided below.

There may be different ways for the central scheduler 20 to acquire information of the tasks to be scheduled. For example, the scheduling of tasks in the local scheduler 205 may uses paravirtualization to inform the central scheduler 20 about the deadline information of the task(s). Hence, the central scheduler 20 may acquire information using paravirtualization of the local schedulers 205, 223. Alternatively, each one of the tasks may be provided in an isolated user space instance. The isolated user space instance defines a container for the task.

There may be different ways to provide the local schedulers 205, 223. Different embodiments relating thereto will now be described in turn. For example, the local schedulers 205, 223 may be implemented as shared hardware functionalities. The shared hardware functionalities may be provided in a network node. For example, the shared hardware functionalities may be provided in at least one core network node.

There may be different ways to provide the remote schedulers 302. Different embodiments relating thereto will now be described in turn. For example, each remote scheduler 302 may be implemented as a dedicated hardware functionality. The dedicated hardware functionalities may be provided in a network node. For example, the dedicated hardware functionality may be provided in a radio access network node 300. The remote scheduler 302 may be part of a radio resource management (RRM) functionality of the radio access network node.

Particular examples and implementation aspects, as well as extensions of the above disclosed embodiments will now be disclosed in detail.

Figure 5:
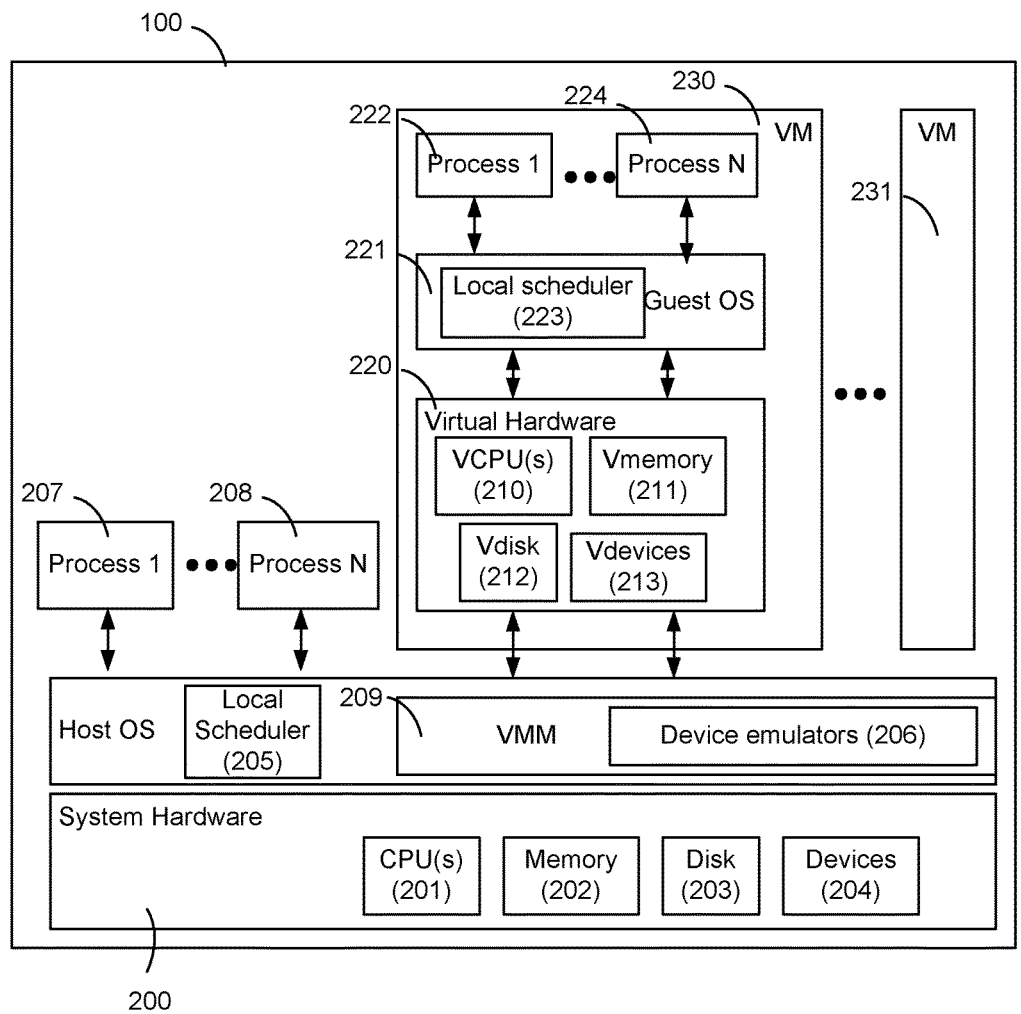
FIGS. 5, 6, 8, and 9 schematically illustrates devices according to embodiments.

FIG. 5 schematically illustrates an apparatus 100 in the form of a general computing platform and in which the embodiments disclosed herein may be implemented. The apparatus 100 may be implemented in a node, such in a core network node, of a communications network, where virtual machines may be used to provide control functions in a controlled network environment. The apparatus 100 may alternatively be implemented in a server. The server may be collocated with a network functionality.

The apparatus 100 comprises system hardware 200 and software. The hardware may comprise one or more CPUs 201, memory 202, one or more disks 203, and one or more devices 204. On top of the hardware resides the host Operating System (OS) comprising a local scheduler 205 configured to select which process 207, 208, 230, 231 to run. A Virtual Machine Manager (VMM) 209 or hypervisor comprises several device emulators 206 and is configured to interface the Virtual Machine with the hardware. To enable this it offers a Virtual Hardware 220 view, which includes one or more Virtual CPUs (VPS), Virtual Memory (VMemory) 211, one or more Virtual Disks (Vdisk) 212, and one or more Virtual Devices (VDevice) 213. The Guest OS 211 uses the virtual hardware provided by the hypervisor to run different processes 222, 224 that can have an execution deadline if they are Real Time (RT) tasks. A RT task may be regarded as a process that has hard or soft constraints when it needs to be executed. One non-limiting example of an RT task is a control process for a radio network. Another non-limiting example of an RT task is a video encoder for video streaming that needs to be executed within a fixed period.

Figure 6:
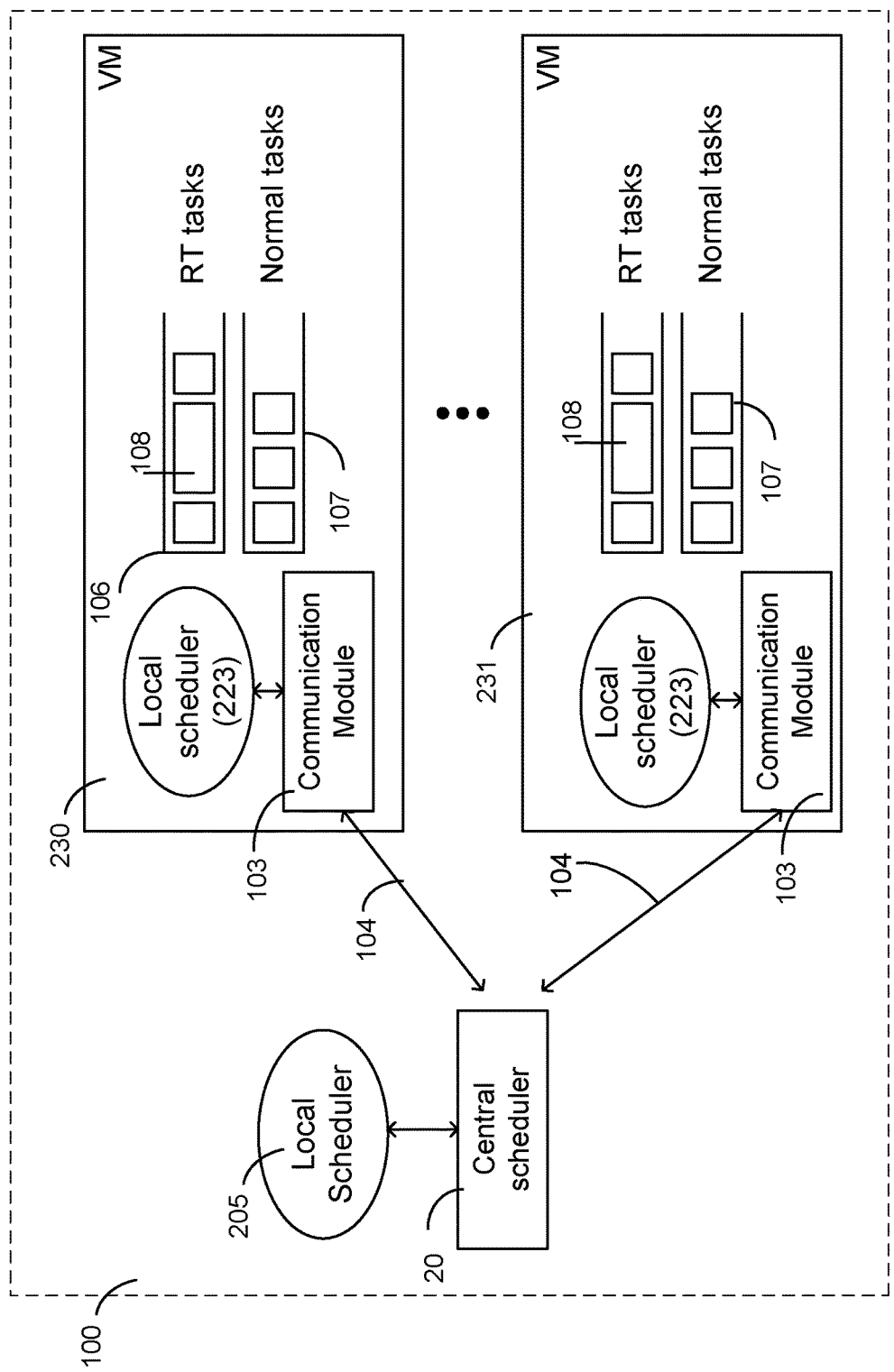

FIG. 6 schematically illustrates an architecture in which a local scheduler 205 interacts with a central scheduler 20. The central scheduler 20 is configured to communicate with a communications module 103 inside the VM. The communications module 103 is aware that a VM with RT tasks with deadlines and non-RT tasks (denoted normal tasks) are running in the apparatus 100. The communications module 103 is configured to communicate with the central scheduler 20 and to inform about the deadlines and duration of the RT task that run on the VM. This communication (schematically identified by reference numeral 104) can be performed with a shared region memory or with a hypercall. A hypercall may be regarded as a mechanism that a VM has to communicate directly with the VMM. The VM comprises a scheduler 223 for scheduling the RT tasks and the normal tasks.

Figure 7:
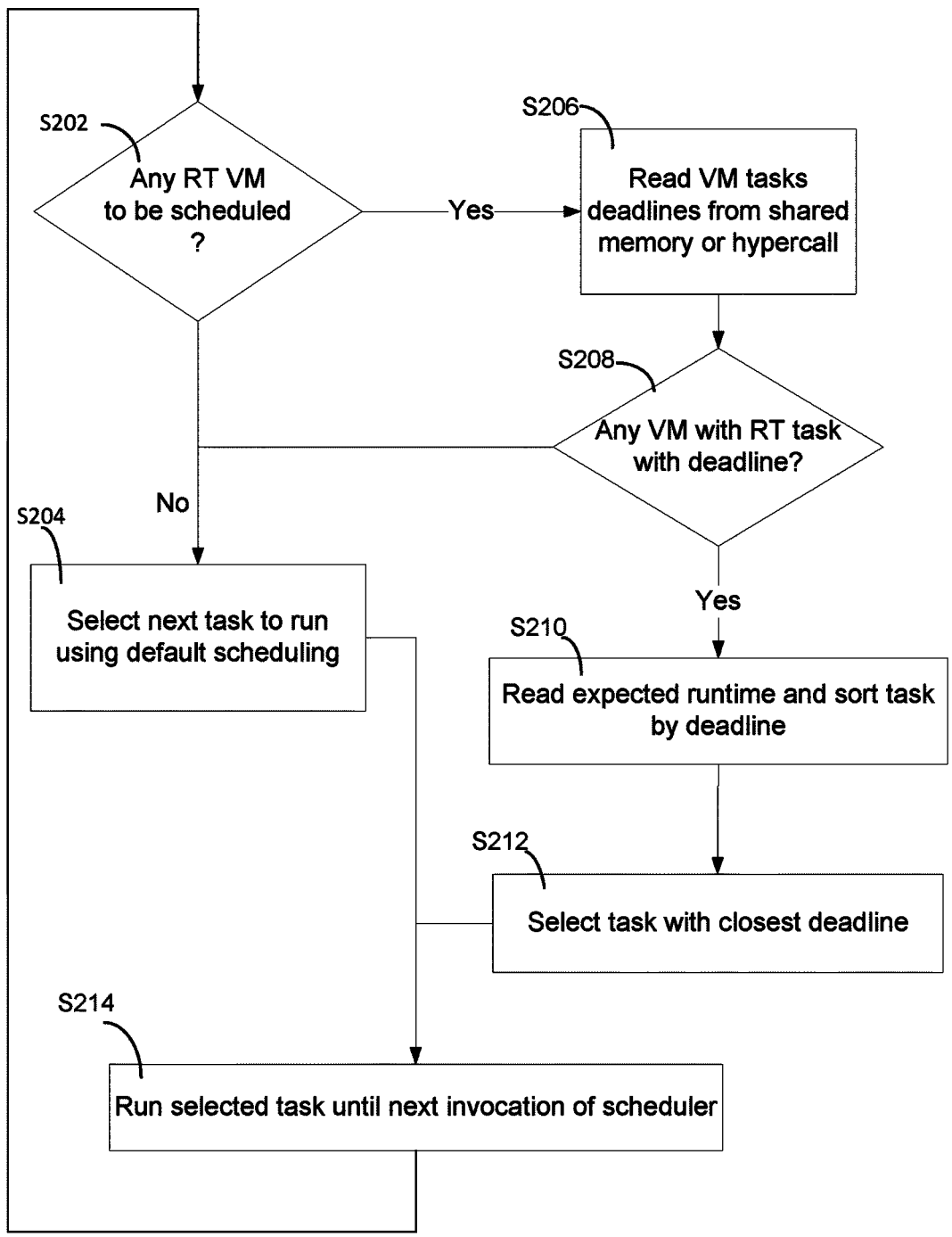

FIG. 7 is a flowchart of a method for how the local scheduler, possibly in collaboration with a central scheduler 20, may select which VM to run its next task. The steps S202-S214 may be performed by the central scheduler 20 executing at least some of the above disclosed steps S102-S106e.

S202: When the local scheduler 205 is invoked by the operating system (OS), it checks in its local information if it needs to execute a Real Time Virtual Machine (RT VM). A RT VM may be regarded as a virtual machine that contains one or more processes that has real time deadline and need to be executed before a given deadline.

S204: If the local scheduler 205 does not have any RT VM running it uses a default scheduler mechanism. The deadline information is associated with the process that runs the VM. It may be kept in a local variable of the local scheduler.

S206: If local scheduler 205 has RT VMs, it reads the deadlines from them. The information is shared with shared memory regions between the VMM and the VM. The information may also be shared through a hypercall from the VM. If the local scheduler 205 does not have any RT VMs it selects the next task using the default scheduler algorithm.

S208: After reading the deadlines, the local scheduler 205 checks if there are any RT tasks that have a deadline.

S210: If there are any RT tasks that have a deadline, the local scheduler 205 calculates the expected runtime for all the RT tasks and sorts them.

S212: The local scheduler 205 selects the RT task with closest deadline. When selecting the RT task the central scheduler 20 takes into account any additional overhead required to switch the VM context.

S214: The selected task is executed. Step S202 may then again be entered.

Deadline scheduling of the network interface may be taken into account when considering the total scheduling architecture so as to optimize the overall performance. A central scheduler 20 may then be configured to communicate with a scheduler of the network interface. As noted above, the scheduler of the network interface is herein termed a remote scheduler 302.

Figure 8:
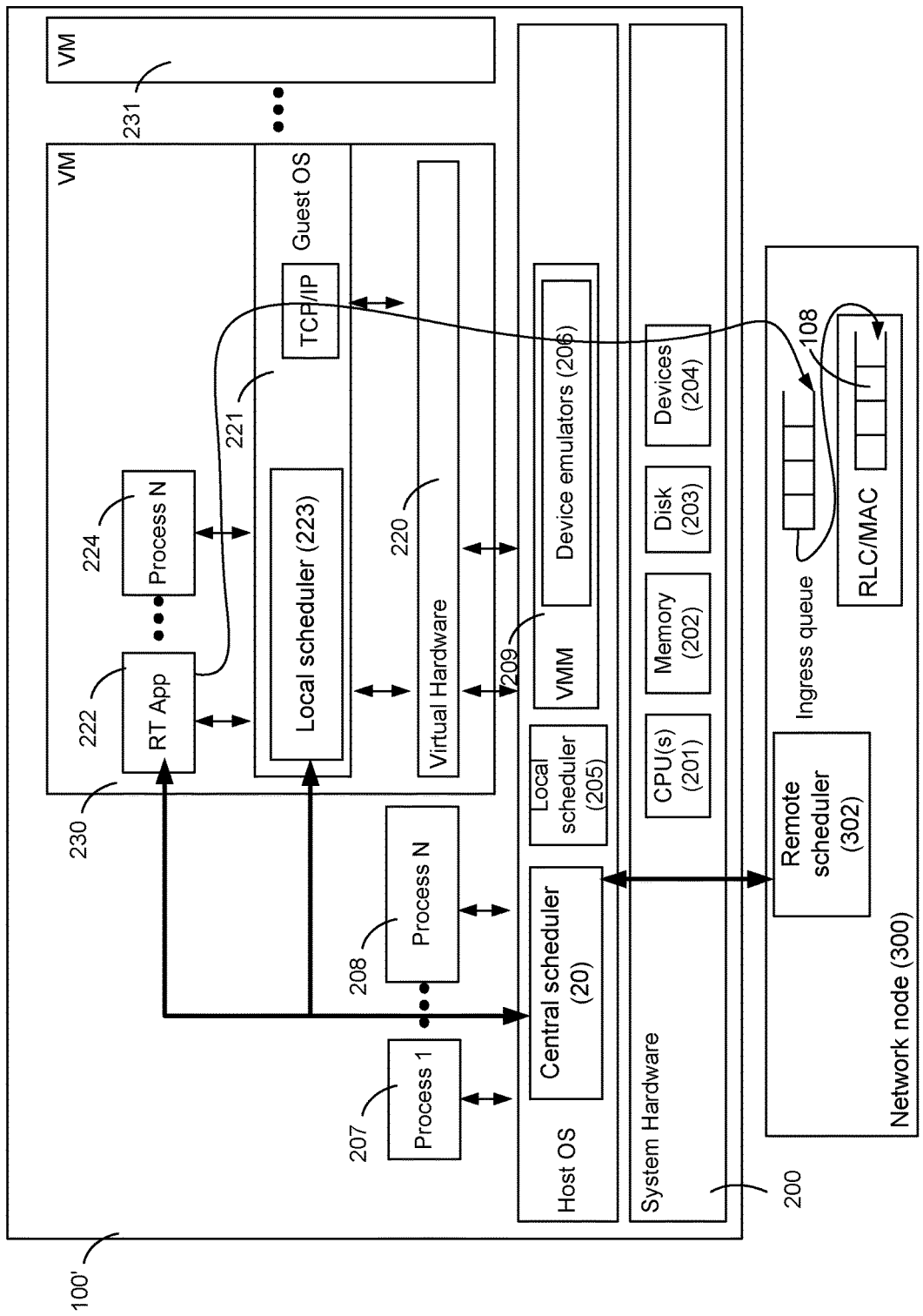

FIG. 8 schematically illustrates an apparatus 100' where the data path for the packets 108 from the protocol stack in the OS via the hypervisor to the system hardware to the remote scheduler 302 is marked, and where one of the processes implements the functionality of the central scheduler 20. Hence, in comparison to the apparatus 100 of FIG. 5, one of the processes implements the functionality of the central scheduler 20. Hence, the central scheduler 20 may in turn be configured to select which other processes 207, 208, 230, 231 the local scheduler 205 should run. The task scheduling may consider the transfer of the packets 108 (i.e. the total transfer time of packets 108 related to an execution in the VM). Thus the execution and the resource for sending and/or receiving packets 108 to/from the remote scheduler 302 may be de included and considered when determining the deadlines as outlined further below.

The time spent for transmission of packets 108 being scheduled between the local scheduler 205 and the remote scheduler 302 may depend on the bandwidth that the network can provide. The remote scheduler 302 may therefore set the packets 108 to deadlines that consider the total deadline expected for both execution and transmission between the local scheduler 205 and the remote scheduler 302.

Figure 9:
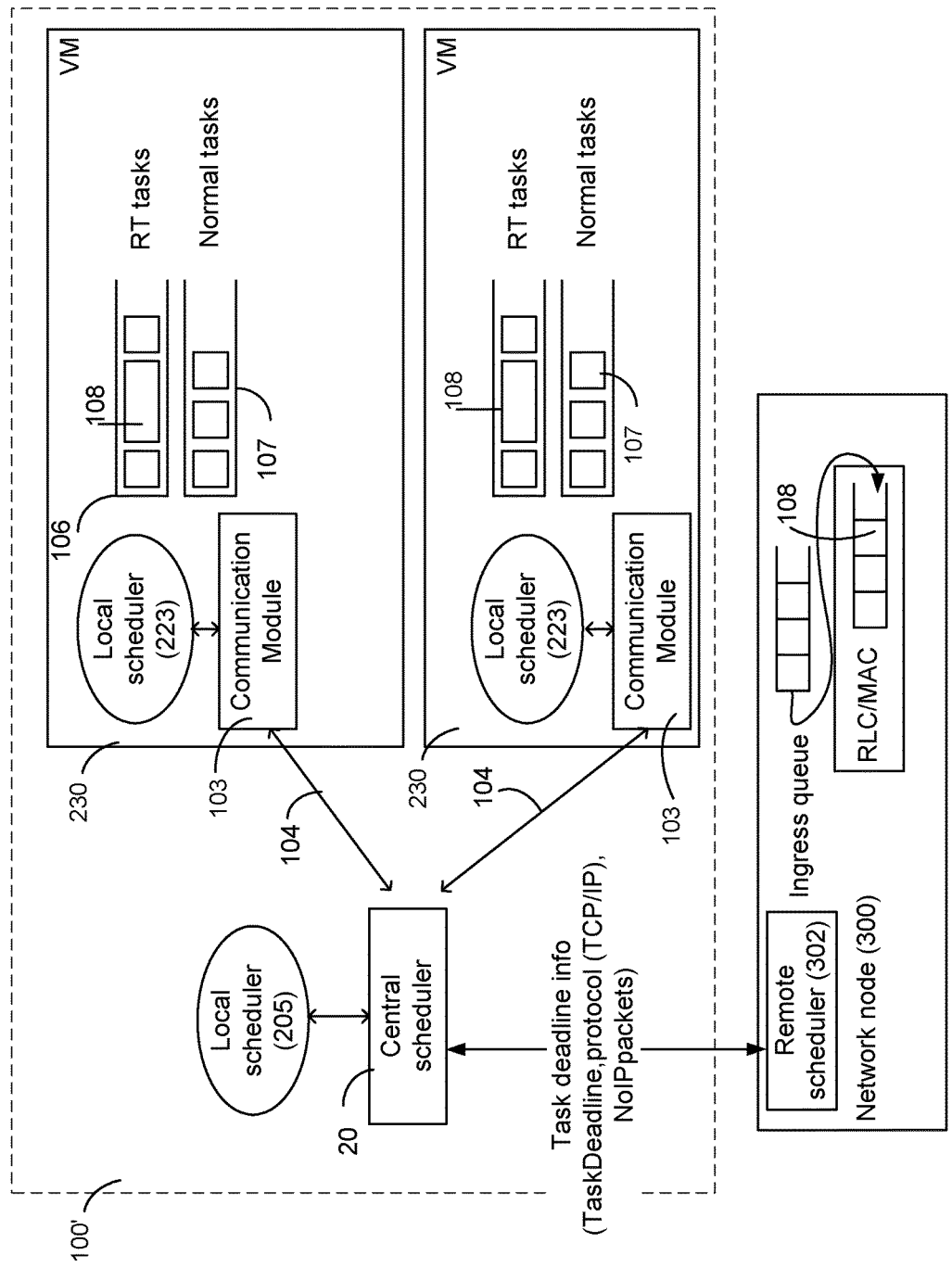

FIG. 9 schematically illustrates an architecture in which a local scheduler 205 interacts with a central scheduler 20. In comparison to the architecture of FIG. 6 the architecture of FIG. 9 further comprises a network node 300. The network node 300 comprises a remote scheduler 302 and is configured to send and/or receive packets 108 in a queue based on, for example, on a radio link control (RLC) layer or a media access (MAC) layer. The central scheduler 20 is configured to communicate with a communications module 103 inside the VM as well as with the remote scheduler 302 of the network node 300. The communications module 103 is aware that a VM with RT tasks with deadlines and non-RT tasks (denoted normal tasks) are running in the apparatus 100, 100'. The communications module 103 is configured to communicate with the central scheduler 20 and to inform about the deadlines and duration of the RT task that run on the VM. This communication (schematically identified by reference numeral 104) can be performed with a shared region memory or with a hypercall. The VM comprises a scheduler 223 for scheduling the RT tasks and the normal tasks.

The central scheduler 20 provides an information flow between the local scheduler 205 (hypervisor) and the remote scheduler 302 (network node 300). The information may be used by the remote scheduler 302 to set the deadline for the packets 108 in its scheduling queue.

Figure 10:
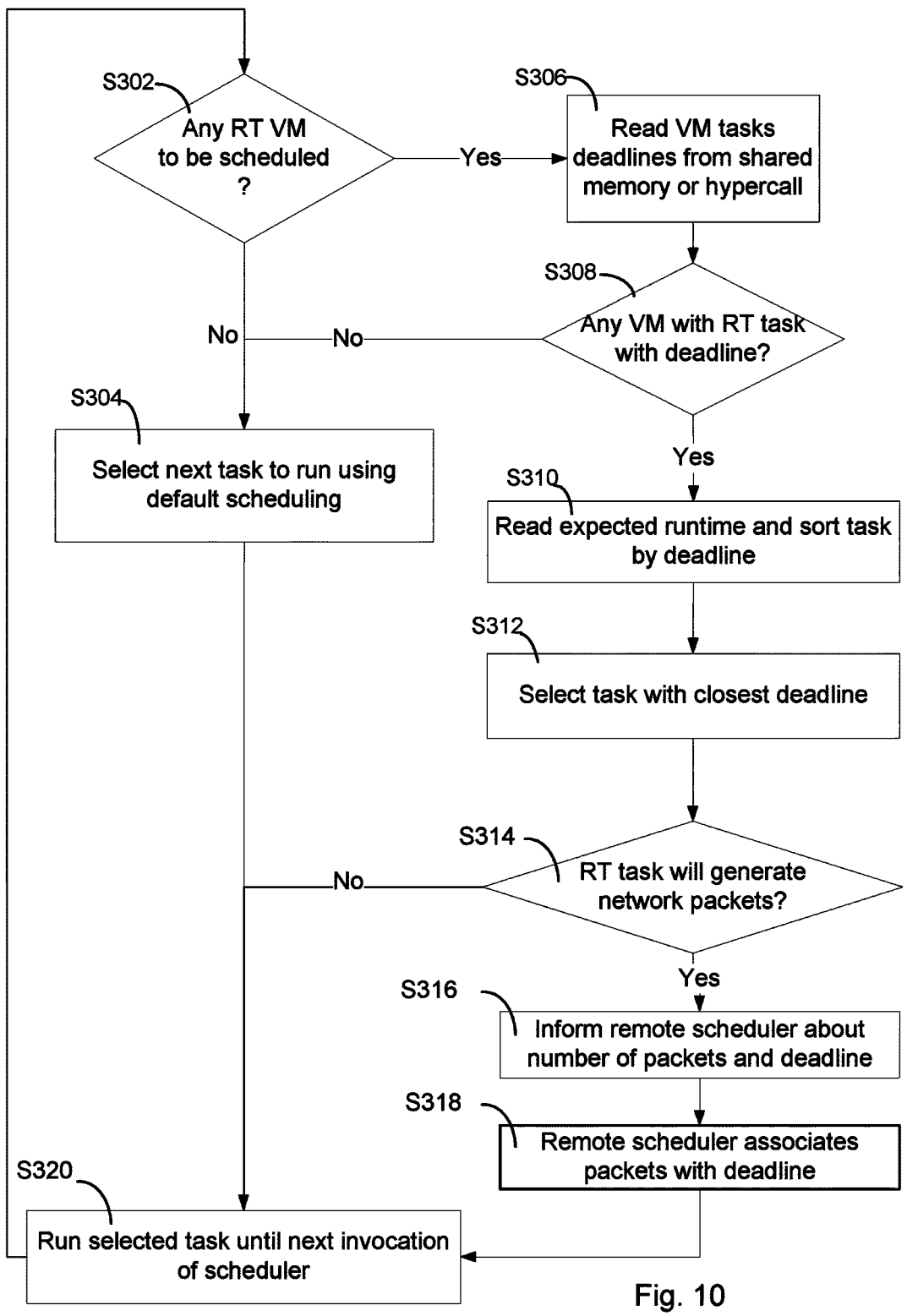

FIG. 10 is a flowchart of a method for how the VMM may select which VM to run its next task. The steps S302-S320 may be performed by the central scheduler 20 executing at least some of the above disclosed steps S102-S106e.

S302: When the central scheduler 20 is invoked by the operating system (OS), it checks in its local information if it needs to execute a Real Time Virtual Machine (RT VM).

S304: If the central scheduler 20 does not have any RT VM running it uses a default scheduler mechanism. The deadline information is associated with the process that runs the VM. It may be kept in a local variable of the central scheduler 20.

S306: If the central scheduler 20 has RT VMs, it reads the deadlines from them. The information is shared with shared memory regions between the VMM and the VM. The information may also be shared through a hypercall from the VM. If the central scheduler 20 does not have any RT VMs it selects the next task using the default scheduler algorithm.

S308: After reading the deadlines, the central scheduler 20 checks if there are any RT tasks that have a deadline.

S310: If there are any RT tasks that have a deadline, the central scheduler 20 calculates the expected runtime for all the RT tasks and sorts them.

S312: The central scheduler 20 selects the RT task with closest deadline. When selecting the RT task the central scheduler 20 takes into account any additional overhead required to switch the VM context.

S314: It is checked if any of the RT tasks will generate network packets. If no, step S320 is entered, and if yes, step S316 is entered.

S316: The central scheduler 20 informs the remote scheduler 302 about the number of packets 108 and at least the absolute deadline of when the packets 108 need to have been sent and/or received.

S318: The remote scheduler 302 associates the packets 108 with corresponding network deadlines.

S320: The selected task is executed. Step S302 may then again be entered.

As noted above, some embodiments are based on the use of containers. Containers may be used in system-level virtualization instead of a hypervisor. In this case, the central scheduler 20 is in charge of scheduling the task inside the container directly. The central scheduler 20 is aware of the tasks that are running inside the containers and determines deadlines as outlined further below.

Figure 11:
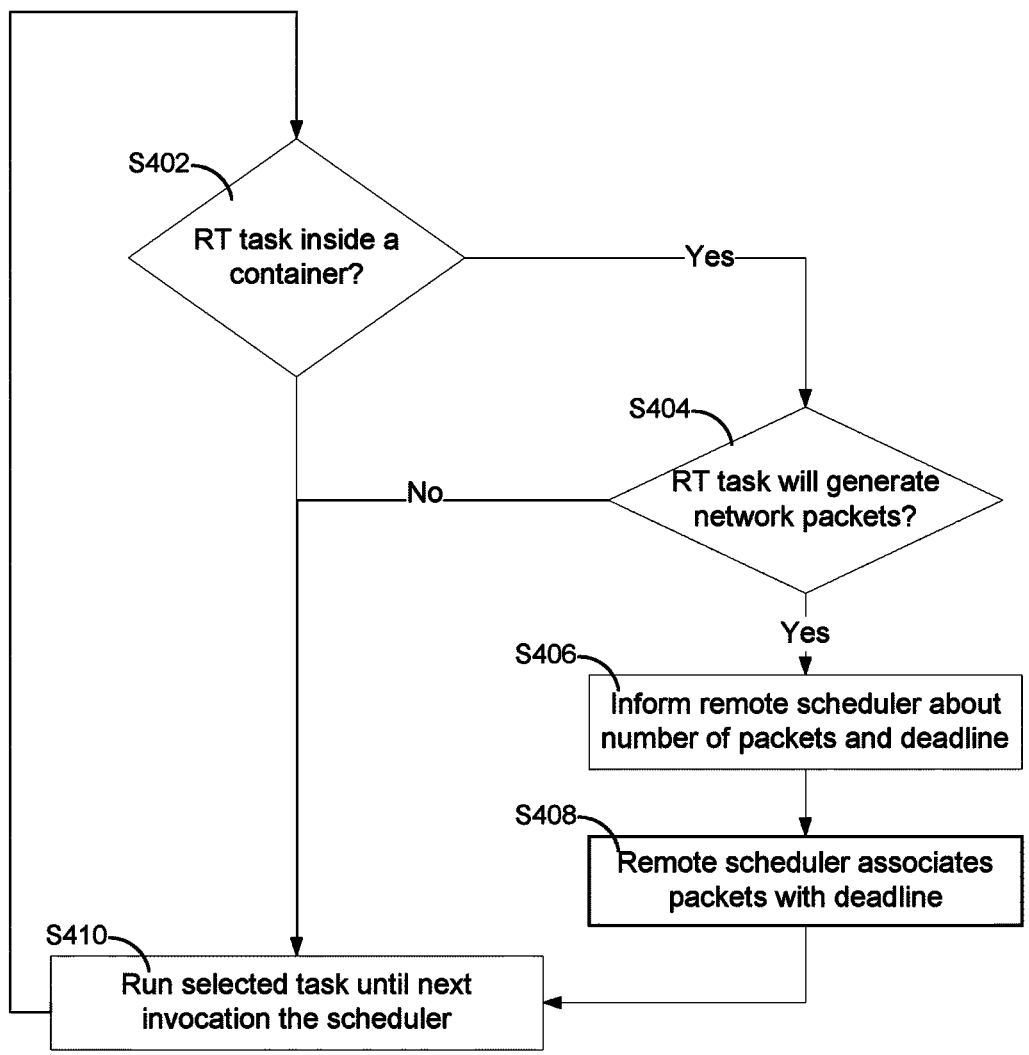

FIG. 11 is a flowchart of a method for how the central scheduler 20 may select which VM to run its next task. The steps S402-S410 may be performed by the central scheduler 20 executing at least some of the above disclosed steps S102-S106e.

S402: When the central scheduler 20 is invoked by the operating system (OS), it checks in its local information if it needs to execute a Real Time task inside a container. If no, step S410 is entered, and if yes, step S404 is entered.

S404: It is checked if any of the RT tasks will generate network packets. If no, step S410 is entered, and if yes, step S406 is entered.

S406: The central scheduler 20 informs the remote scheduler 302 about the number of packets 108 and at least the absolute deadline of when the packets 108 need to have been sent and/or received.

S408: The remote scheduler 302 associates the packets 108 with corresponding network deadlines.

S410: The selected task is executed. Step S402 may then again be entered.

As noted above, there may be different types of deadlines. There may be different ways of how to determine the deadlines. For example, the central scheduler 20 may be configured to acquire information regarding the absolute deadline for a given task, the number of packets 108 that the task is expected to generate and the estimated runtime for the task to be executed. The central scheduler 20 may for example interact with a remote scheduler 302 and a local scheduler 205 to set appropriate deadlines for the different RT tasks.

The deadline may be separated between a compute deadline and a network deadline. A network entity, operator, event, etc. may define, or trigger, the absolute deadline of a task and other components may be adjusted dynamically as a function of the state of the system and network.

Figure 12:
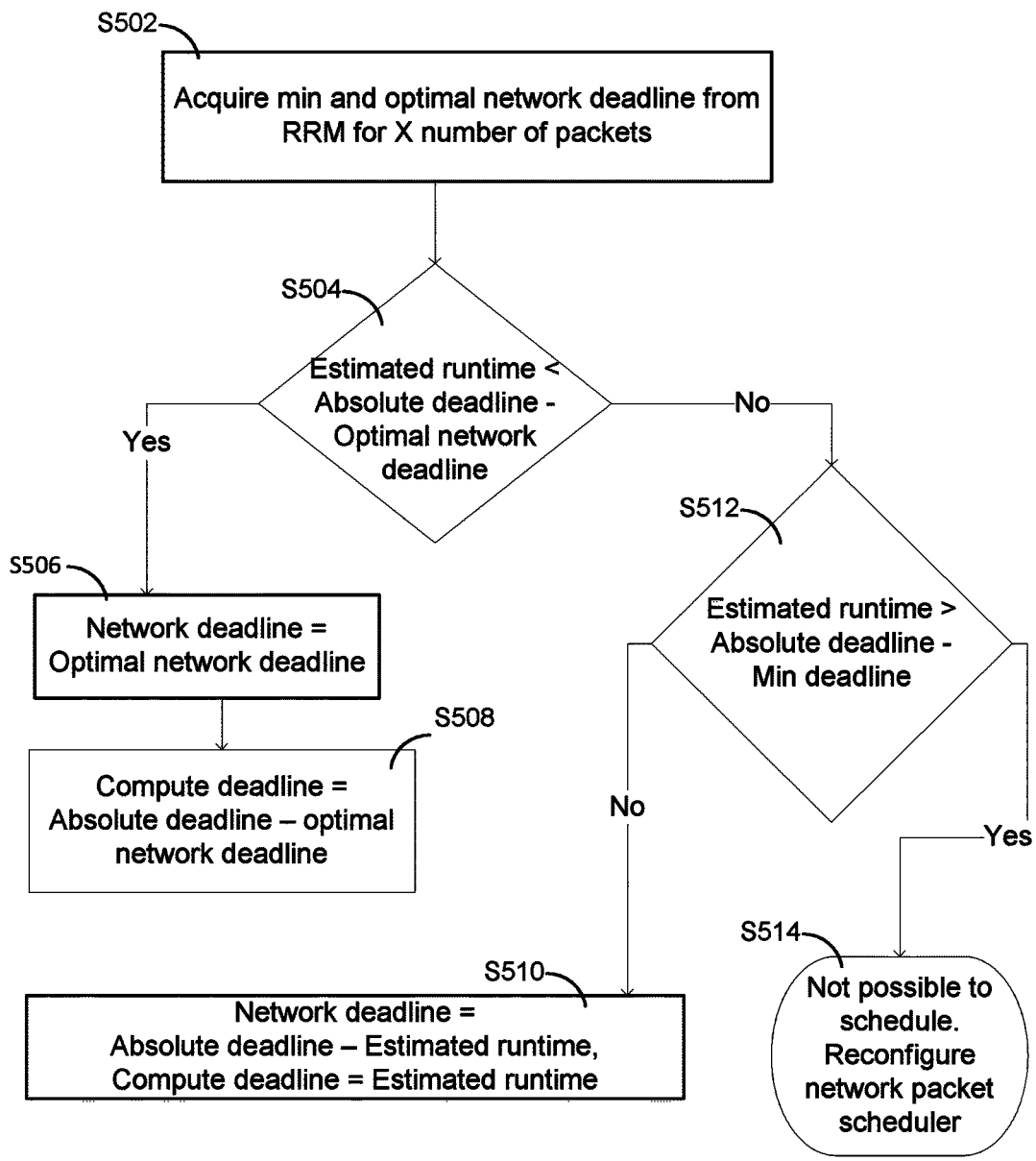

FIG. 12 is a flow chart for determining deadlines. The steps S502-S514 may be performed by the central scheduler 20, possibly in interaction with the local scheduler 205 and the remote scheduler 302, by the central scheduler 20 executing at least some of the above disclosed steps S102-S106e.

S502: Minimum and optimal network deadlines (for a particular number of packets) are acquired from the remote scheduler 302.

S504: If the estimated runtime is smaller than the difference of the absolute deadline and the optimal network deadline step S506 is entered, and if not, step S512 is entered.

S506: The network deadline is determined as the optimal network deadline.

S508: The compute deadline is determined as the difference between the absolute deadline and the optimal network deadline S510: The network deadline is determined as the difference between the absolute deadline and the estimated runtime, and the compute deadline is determined as the estimated runtime S512: If the estimated runtime is larger than the difference between the absolute deadline and the minimum deadline step S510 is entered, and if not, step S514 is entered.

S514: It is not possible to schedule the task such that the given deadline conditions are fulfilled. The remote scheduler 302 is instructed to be reconfigured. Once the remote scheduler 302 has been reconfigured, step S502 may again be entered.

In general terms, the absolute deadline may be defined as the deadline according to which a generated packet 108 of the task has to be sent or received from a remote scheduler 302.

In general terms, the compute deadline may be defined as the deadline assigned to the task to be performed in a processing unit.

In general terms, the network deadline may be defined as the deadline according to which a generated packet 108 of the task has to be sent or received from an external network.

In general terms, the runtime may be defined as the time needed for a task to be executed and may depend on the number of instructions to be executed. Once the task has been executed, the runtime may be reported back to the application (or central scheduler 20) in order to finely tune the runtime for the next execution.

In general terms, the estimated runtime may be defined as the runtime in which the application is expected to finish its execution based on previous executions.

In general terms, the optimal network deadline may be defined as the network deadline for which the network functionality has been optimized as a function of a utility function. The optimal network deadline may be determined depending on, for example, parameters to be optimize, such as maximal throughput, minimal energy consumption, minimal latency, etc.

To give an example of how deadlines may be determined, if low power utilization in the network is required, the network deadline may be increased since entities in the network may be able to send and/or receive packets 108 at lower rates.

The remote scheduler 302 may be responsible to report the optimal network deadline and the minimal network deadline possible for the current state of the network to the central scheduler 20. The remote scheduler 302 may be configured to determine which parameters to adjust based on policies defined by the network operator, such as maximal throughput, minimal energy consumption, minimal latency, etc.

Figure 13:
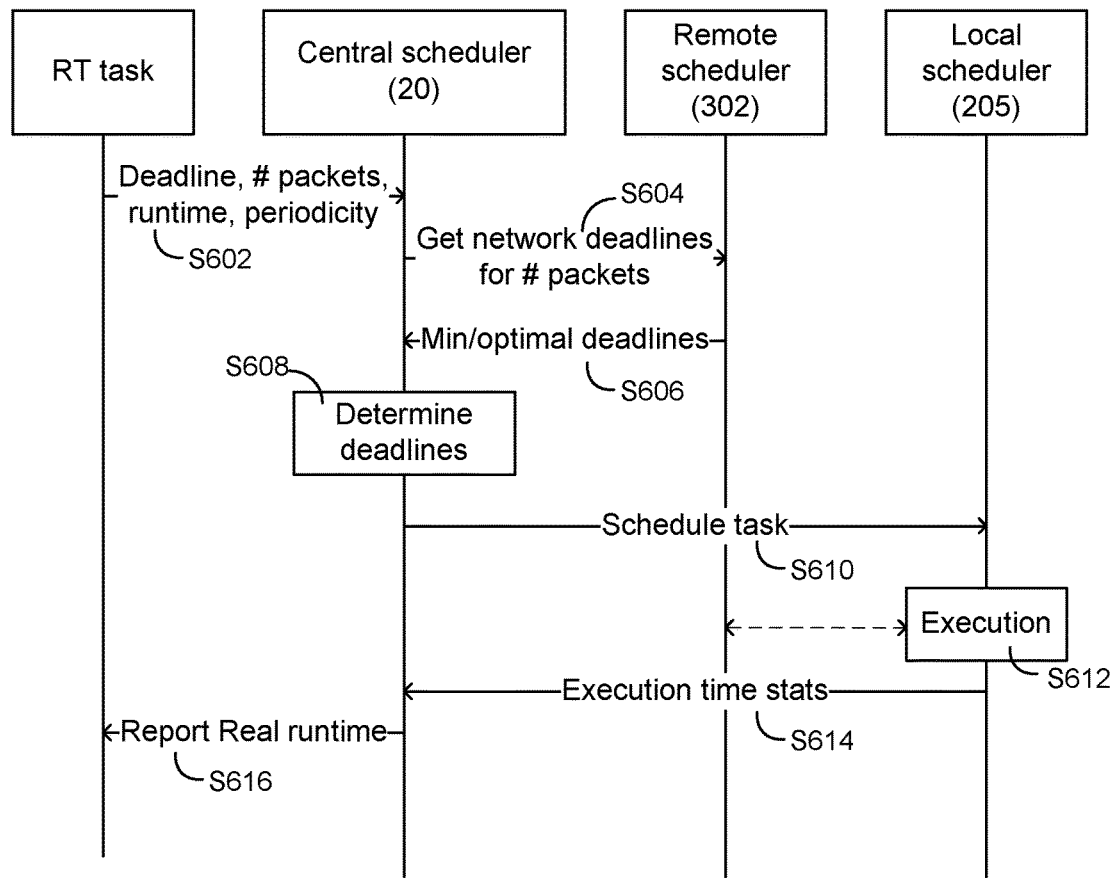
FIGS. 13 and 14 are signalling diagrams according to embodiments.

FIG. 13 is a signalling diagram for executing a RT task according to one embodiment. The steps S602-S16 (except step S612) may be performed by the central scheduler 20 executing at least some of the above disclosed steps S102-S106e.

S602: The central scheduler 20 acquires information, such as absolute deadline, number of packets, runtime, and periodicity for a RT task.

S604: The central scheduler 20 requests network deadlines for the number of packets 108 from the remote scheduler 302. This request is received by the remote scheduler 302.

S606: The remote scheduler 302 responds with the minimal and/or optimal network deadlines for the number of packets. This response is received by the central scheduler 20.

S608: The central scheduler 20 determines the deadlines, for example according to the flowchart of FIG. 12.

S610: The central scheduler 20 schedules the RT task for execution to the local scheduler 205.

S612: The local scheduler 205 handles execution of the RT task, possibly with interaction with the remote scheduler 302, for transmitting and/or receiving packets 108 of the RT task.

S614: The local scheduler 205 reports execution time statistics of the executed RT task to the central scheduler. This information is received by the central scheduler 20.

S616: The central scheduler 20 reports the runtime to the RT task.

Figure 14:
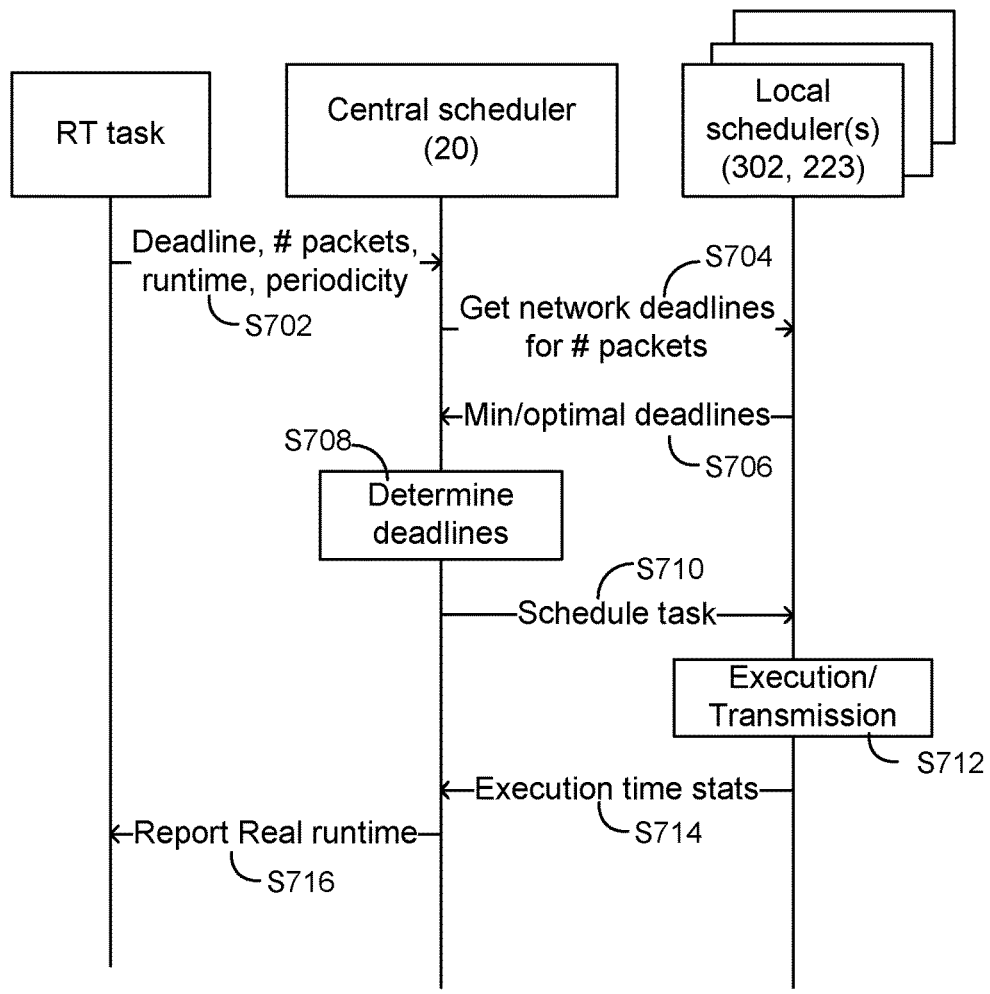

FIG. 14 is a signalling diagram for executing a RT task according to another embodiment. The steps S702-716 (except step S712) may be performed by the central scheduler 20 executing at least some of the above disclosed steps S102-S106e.

S702: The central scheduler 20 acquires information, such as absolute deadline, number of packets, runtime, and periodicity for a RT task.

S704: The central scheduler 20 requests network deadlines for the number of packets 108 from one or more local schedulers 205, 223. This request is received by the one or more local schedulers 205, 223.

S706: The one or more local schedulers 205, 223 responds with the minimal and/or optimal network deadlines for the number of packets. This response (or responses) is received by the central scheduler 20.

S708: The central scheduler 20 determines the deadlines, for example according to the flowchart of FIG. 12.

S710: The central scheduler 20 schedules the RT task for execution to the one or more local schedulers 205, 223.

S712: The one or more local schedulers 205, 223 handles execution of the RT task.

S714: The one or more local schedulers 205, 223 reports execution time statistics of the executed RT task to the central scheduler 20. This information is received by the central scheduler 20.

S716: The central scheduler 20 reports the runtime to the RT task.

One particular embodiment of coordinated scheduling between real-time processes will now be disclosed. Assume now, without loss of generality, an architecture where a VM, a hypervisor and a networking interface are configured to communicate with each other. The networking interface may be a networking interface of a network node 300, such as an eNodeB either with embedded processing or an eNodeB provided as a separate network node 300. In both case, it is assumed that the packet scheduling as handled by a remote scheduler 302 in the network node 300 may be controlled by the central scheduler 20 sending information to the remote scheduler 302 in the network node 300.

Assume further that the overall scheduling of tasks and packet queues is to be scheduled such that the overall real-time performance is optimized. Both the execution within the VM, between VMs and network nodes could be coordinated by propagating information about the deadlines by the central scheduler 20 performing at least steps S102 and S106 as disclosed above. Thus execution and networking capacity may be more efficiently used compared to independent scheduling of each VM and each network node.

As noted above, the local scheduler 205 of the RT task inside the VM may use a paravirtualization approach to inform the central scheduler 20 about the deadline information of all the RT running tasks in order to enable efficient execution of the different RT tasks in a global context. For example, the local scheduler 205 may provide information with a hypercall, with a share memory or another communication mechanism to the central scheduler 20 regarding the task to be performed. The central scheduler 20 may thereby schedules the different VMs in a way that the all tasks are executed within their deadlines, which may be different for different task. This may involve the central scheduler 20 performing at least step S102, and possibly S104.

Then the central scheduler 20 may use the deadline information to schedule the different VMs, taking into account the overhead introduced by switching between VMs. This may involve the central scheduler 20 performing at least step S106. The central scheduler 20 may propagate the deadlines also to the remote scheduler 302 in the network node 300. This may involve the central scheduler 20 performing at least step S106c.

In summary, according to at least some of the herein disclosed embodiments there has been presented mechanisms for coordinated scheduling between real-time processes. At least some of these mechanisms are based on using a paravirtualization approach to schedule the VMs for real time systems using the deadlines of the different tasks instead of priorities. Without this information the VM is seen as a black box, where all the processes are considered equal by the VMM.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for coordinated scheduling between real-time processes, the method being performed by a central scheduler, the method comprising:
acquiring information on runtimes and deadlines for real-time processes of tasks for local schedulers to be executed on shared computing resources, wherein the deadlines comprise an estimated runtime, an absolute deadline, and a minimum network deadline,
calculating a network deadline and a compute deadline for each respective task for the local schedulers, wherein the network deadline is a deadline for when packets need to be sent to or received from a remote scheduler and the compute deadline is a deadline assigned to the task to be completed by the local scheduler, and wherein a remote scheduler is reconfigured when it is determined that an estimated runtime is larger than a difference between an absolute deadline of when the packets need to have been sent and received and a minimum network deadline, wherein the network deadline is determined as a difference between the absolute deadline and an estimated runtime, and the compute deadline is determined as the estimated runtime;
scheduling the real-time processes based on said runtimes and deadlines so as to keep said deadlines during execution of the real-time processes;
acquiring a need from a local scheduler responsible for performing one of said tasks, said one task requiring packets of a remote scheduler to be scheduled;
sending information relating to said deadlines-and information indicative of the number of packets expected to be generated by the local scheduler when performing the task, to the remote scheduler;
calculating network deadline and a compute deadline for each respective task associated with the acquired need from the local scheduler; and
determining whether each respective task associated with the acquired need can be scheduled or whether to reconfigure the remote scheduler based on the calculation.

2. The method according to claim 1, wherein scheduling the real-time processes further comprises: sorting scheduling of all tasks according to their respective deadlines.

3. The method according to claim 1, wherein scheduling the real-time processes further comprises: selecting one of said real-time processes with the earliest deadline to be executed first by the shared computing resources.

4. The method according to claim 1, wherein scheduling the real-time processes is further based on a time for switching between different ones of the real-time processes being executed in the shared computing resources.

5. The method according to claim 1, wherein said information acquired using para virtualization of the local schedulers.

6. The method according to claim 1, wherein the local schedulers are implemented as shared hardware functionalities.

7. A central scheduler for coordinated scheduling between real-time processes, the central scheduler comprising:
communications interface circuitry configured for communications with schedulers; and
processing circuitry operatively associated with the communications interface circuitry and configured to:
acquire information on runtimes and deadlines for real-time processes of tasks for local schedulers to be executed on shared computing resources wherein the deadlines comprise an estimated runtime, an absolute deadline, and a minimum network deadline,
calculate a network deadline and a compute deadline for each respective task for the local schedulers, wherein the network deadline is a deadline for when packets need to be sent to or received from a remote scheduler and the compute deadline is a deadline assigned to the task to be completed by the local scheduler, and wherein a remote scheduler is reconfigured when it is determined that an estimated runtime is larger than a difference between an absolute deadline of when the packets need to have been sent and received and a minimum network deadline, wherein the network deadline is determined as a difference between the absolute deadline and an estimated runtime, and the compute deadline is determined as the estimated runtime;
schedule the real-time processes based on said runtimes and deadlines so as to keep said deadlines during execution of the real-time processes;
acquire a need from a local scheduler responsible for performing one of said tasks, said one task requiring packets of a remote scheduler to be scheduled;
send information relating to said deadlines and information indicative of the number of packets expected to be generated by the local scheduler when performing the task, to the remote scheduler;
calculate network deadline and a compute deadline for each respective task associated with the acquired need from the local scheduler; and
determine whether each respective task associated with the acquired need can be scheduled or whether to reconfigure the remote scheduler based on the calculation.

8. A non-transitory computer readable storage medium storing a computer program for coordinated scheduling between real-time processes, the computer program comprising computer program code that, when run on processing circuitry of a central scheduler causes the processing circuitry to:
acquire information on runtimes and deadlines for real-time processes of tasks for local schedulers to be executed on shared computing resources, wherein the deadlines comprise an estimated runtime, an absolute deadline, and a minimum network deadline,
calculate a network deadline and a compute deadline for each respective task for the local schedulers, wherein the network deadline is a deadline for when packets need to be sent to or received from a remote scheduler and the compute deadline is a deadline assigned to the task to be completed by the local scheduler, and wherein a remote scheduler is reconfigured when it is determined that an estimated runtime is larger than a difference between an absolute deadline of when the packets need to have been sent and received and a minimum network deadline, wherein the network deadline is determined as a difference between the absolute deadline and an estimated runtime, and the compute deadline is determined as the estimated runtime;
schedule the real-time processes based on said runtimes and deadlines so as to keep said deadlines during execution of the real-time processes;
acquire a need from a local scheduler responsible for performing one of said tasks, said one task requiring packets of a remote scheduler to be scheduled;
send information relating to said deadlines and information indicative of the number of packets expected to be generated by the local scheduler when performing the task, to the remote scheduler;
calculate network deadline and a compute deadline for each respective task associated with the acquired need from the local scheduler; and
determine whether each respective task associated with the acquired need can be scheduled or whether to reconfigure the remote scheduler based on the calculation.

* * * * *